Figure 3:
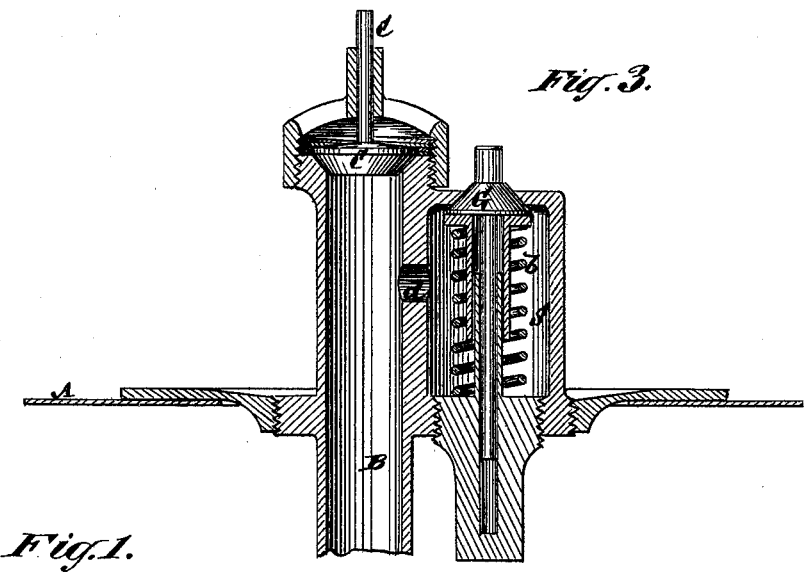

J. H. RHODES.
Valve of Tanks for Supplying Water to Buildings.

No. 214,451. Patented April 15, 1879.

Witnesses
John Becker
Fred. Haynes

Inventor
John H. Rhodes
by his Attorney
Brown & Brown

UNITED STATES PATENT OFFICE.

JOHN H. RHODES, OF BROOKLYN, NEW YORK.

IMPROVEMENT IN VALVES OF TANKS FOR SUPPLYING WATER TO BUILDINGS.

Specification forming part of Letters Patent No. 214,451, dated April 15, 1879; application filed October 12, 1878.

*To all whom it may concern:*

Be it known that I, JOHN H. RHODES, of the city of Brooklyn, in the county of Kings and State of New York, have invented a new and useful Improvement in Valves of Tanks for Supplying Water to Buildings, of which the following is a description, reference being had to the accompanying drawings, which form part of this specification.

This invention relates to the supply of water under pressure to buildings from tanks to which the water is supplied from a street-main or other source under pressure. Ordinarily such tanks are arranged in the top of the building, and the service-pipe which supplies the tank with water from the main is fitted with a check-valve opening to admit water into the tank, but closing against its return down said pipe, the water being drawn off as required for use by a distributing pipe or pipes connected with the tank. Such tanks provide for the supply of water to the upper floors of a building equally with the lower floors, and the supply of water from the main compresses a volume of air above the water in the tank, which keeps the water under pressure in the latter. This pressure is maintained, and, unless special means are provided for affording relief, is continually added to by the repeated ingress to the tank of water from the main every time the discharge or distributing pipe is drawn upon. Such additional pressure is due to the momentum of the water, as in the action of the hydraulic ram, but by its accumulation there is great risk of the tank being burst. To utilize this power, and to provide against such danger without blowing off the compressed air from the tank, which would neutralize the ram-like action above referred to, is one of the objects of the invention, and it is very desirable to retain said power when the same can be done with safety, inasmuch as the volume of compressed air in the tank acts as a cushion to the ram-like action of the supply, and relieves and takes up the surplus pressure on the pipes and other appurtenances in the building, thereby avoiding rupture of the pipes, driving out of washers, and flooding of the premises.

The invention consists in a combination, with the service-pipe and close tank or reservoir with which said pipe is connected, of a combined check and relief valve, operating to keep up the ram-like action of the supply, and automatically affording relief against any dangerous excess of pressure without blowing off or wasting the compressed air in the tank. Such invention is especially adapted to buildings of the French-flat system, as well as upon high grades, or where the supply is variable or intermittent from any cause. Upon old services, where a full application of the plan may not be desirable, the close tank having a combined check and relief valve applied to it may be a mere storage-chamber placed under the wash-basin, closet, or in some other convenient place, for action independently of the general service, and serving to keep up a supply while water is being drawn off below.

Figure 1:
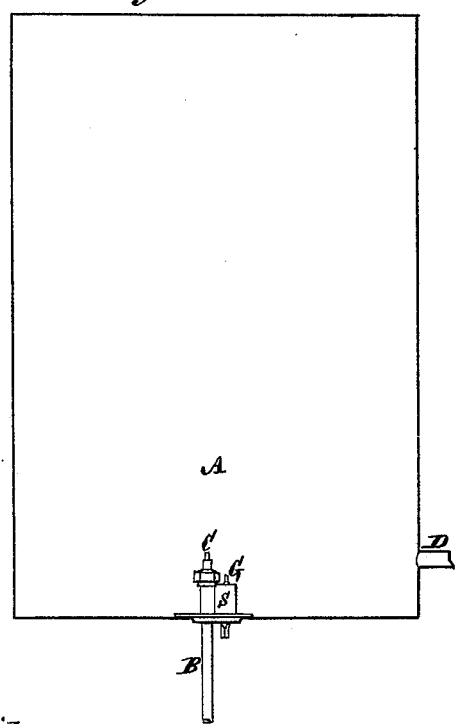
Figure 2:
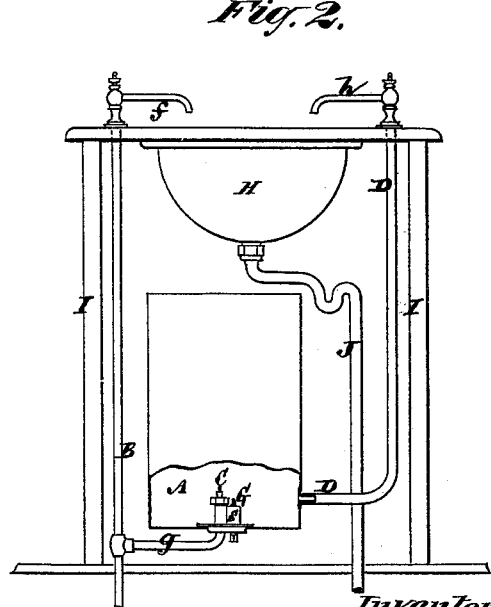

In the accompanying drawings, Figure 1 is a diagram showing a close tank or reservoir suitable for supplying a building with water by either an upward or downward distribution, and having my combined check and relief valve applied to it. Fig. 2 is a diagram, showing, in elevation, the invention, as applied to a wash basin or stand. Fig. 3 is a vertical section of said combined check and relief valve upon a larger scale.

Referring, in the first instance, to Figs. 1 and 3, A is the tank, which may be on the top of a building. This tank is a close one, and is supplied with water from the main by a service-pipe or supply-duct, B, having a check-valve C, as heretofore, on its delivery end, to admit of water entering the tank, but preventing its return down said pipe. D is the discharge or distributing pipe from the tank to the several floors of the building.

Combined with the check-valve C is a relief-valve, G, the two together forming what I term a "duplex" or "combined" check and relief valve. This relief-valve G controls a separate chamber or duct, S, and is loaded or controlled by a spring, $b$, to resist the extreme pressure which it is determined that the tank should carry. Said relief-valve is arranged to open to the egress of water from the tank back into the service-pipe B by a passage, $d$, whenever the pressure is in excess, said passage connecting the chamber S with the service-pipe B. In this way, or by these means, there is no waste of compressed air in the tank by blowing it off when the pressure is in excess, bursting of the tank is avoided, and the power of the ram-like action of the water is preserved.

In Fig. 2 of the drawings, the same principle of action is shown as applied to supplying a stationary wash-basin, H, with water from a storage chamber or tank, A, without interfering with the general service or being independent thereof, and serving to keep up a supply while water is being drawn off below. I is the case or stand of said basin, and J the discharge or waste pipe from the latter. B is the service-pipe, which is fitted with the usual cock $f$ for supplying the basin with water in the ordinary way. Should such supply, however, fail or be crippled by water in the service-pipe being drawn off from a lower source, then the water in the close tank A is made available. This tank is arranged beneath the basin H, or otherwise in suitable relation with it, and is supplied with water from the service-pipe B by a branch pipe, $g$, which is fitted on its delivery end with the check-valve C, that has combined with it the relief-valve G, hereinbefore referred to, for operation as described, to relieve the tank of excess of pressure without waste of the volume of compressed air in the tank, and to keep up the ram-like action of the supply as water is drawn from the distributing-pipe D. Said distributing-pipe in Fig. 2 is fitted with a cock, $h$, for supplying the basin H with water from the tank. This extra cock $h$ is only used when it is difficult or impossible to obtain water from the service-pipe direct, the tank A containing a reserve supply of water to meet such exigencies.

Each upper wash-basin stand, water-closet, or sink in a building may thus be furnished with a separate supply-reservoir or storage-chamber fitted with the duplex or combined check and relief valve or valves C G, for action as specified.

I claim—

The combination, with the check-valve C and the service-pipe or supply-duct B, of the loaded relief-valve G and the passage $d$, between said service-pipe and chamber of the relief-valve, for operation in connection with a close distributing-tank, substantially as and for the purposes specified.

JOHN H. RHODES.

Witnesses:
 JESSE C. BEAM,
 JOHN D. RHODES.